US012368831B2

(12) United States Patent
Fleureau et al.

(10) Patent No.: US 12,368,831 B2
(45) Date of Patent: Jul. 22, 2025

(54) METHOD AND APPARATUS FOR ENCODING AND DECODING VOLUMETRIC CONTENT IN AND FROM A DATA STREAM

(71) Applicant: INTERDIGITAL CE PATENT HOLDINGS, SAS, Paris (FR)

(72) Inventors: Julien Fleureau, Rennes (FR); Renaud Dore, Rennes (FR); Bertrand Chupeau, Rennes (FR); Franck Thudor, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 34 days.

(21) Appl. No.: 18/012,083

(22) PCT Filed: Jun. 14, 2021

(86) PCT No.: PCT/EP2021/065894
§ 371 (c)(1),
(2) Date: Dec. 21, 2022

(87) PCT Pub. No.: WO2021/259686
PCT Pub. Date: Dec. 30, 2021

(65) Prior Publication Data
US 2023/0239451 A1 Jul. 27, 2023

(30) Foreign Application Priority Data
Jun. 24, 2020 (EP) .................................... 20305695

(51) Int. Cl.
*H04N 13/161* (2018.01)
*H04N 13/178* (2018.01)
*H04N 19/70* (2014.01)
(52) U.S. Cl.
CPC ......... *H04N 13/161* (2018.05); *H04N 13/178* (2018.05); *H04N 19/70* (2014.11)

(58) Field of Classification Search
CPC ..... H04N 13/161; H04N 19/70; H04N 13/178
(Continued)

(56) References Cited

U.S. PATENT DOCUMENTS

| 2021/0074029 A1* | 3/2021 | Fleureau | ................... G06T 3/40 |
| 2022/0078486 A1* | 3/2022 | Hannuksela | ....... H04N 21/8456 |

FOREIGN PATENT DOCUMENTS

| EP | 3515068 A1 | 7/2019 |
| WO | WO 2020055869 A1 | 3/2020 |

OTHER PUBLICATIONS

Tourapis et al., "H.264/14496-10 AVC Reference Software Manual", Joint Video Team (JVT) of ISO/IEC MPEG & ITU-T VCEG (ISO/IEC JTC1/SC29/WG11 and ITU-T SG16 Q.6), Document No. JVT-AE010, 31st Meeting: London, Great Britain, Jun. 28, 2009, 90 pages.

(Continued)

*Primary Examiner* — Jeffery A Williams
(74) *Attorney, Agent, or Firm* — Condo Roccia Koptiw LLP

(57) ABSTRACT

Methods and apparatus for encoding and decoding a volumetric scene are disclosed. A set of attribute and geometry patches is obtained by projecting samples of the volumetric scene onto the patches according to projection parameters. If the geometry patch is comparable to a planar layer located at a constant depth according to the projection parameters, only the attribute patch is packed in an attribute atlas image and the depth value is encoded in metadata. Otherwise, both attribute and geometry patches are packed in an atlas. At the decoding, if metadata for an attribute patch indicates that its geometry may be determined from the projection parameters and a constant depth, the attributes are inverse projected on a planar layer. Otherwise, attributes are inverse projected according to the associated geometry patch.

18 Claims, 6 Drawing Sheets

(58) Field of Classification Search
USPC .......................................................... 348/43
See application file for complete search history.

(56) References Cited

OTHER PUBLICATIONS

Salahieh et al., "Test Model for Immersive Video", International Organisation for Standardisation, ISO/IEC JTC 1/SC 29/WG 11, Coding of Moving Pictures and Audio, Document: N18470, Geneva, Switzerland, Mar. 2019, 27 pages.

Fleureau et al., "Cardboard patches for MIV", International Organisation for Standardisation, ISO/IEC JTC 1/SC 29/WG 11, Coding of Moving Pictures and Audio, Document: MPEG2020/M54417, online, Jul. 2020, 4 pages.

Anonymous, "AV1 Codec Library", Alliance for Open Media, Url: https://aomedia.googlesource.com/aom, 13 pages.

Anonymous, Terminal Equipment and Protocols for Telematic Services—Information Technology—Digital Compression and Coding of Continuous-Tone Still Images—Requirements and Guidelines, International Telecommunication Union (ITU), The International Telegraph and Telephone Consultative Committee (CCITT), Document: T.81, Sep. 1992, 189 pages.

Fleureau et al., "Description of Technicolor Intel response to MPEG-I 3DoF+ Call for Proposal", International Organisation for Standardisation, ISO/IEC JTC1/SC29/WG11, Coding of Moving Pictures and Audio, Document: MPEG2019/m47445, Geneva, Switzerland, Mar. 2019, 24 pages.

Anonymous, "Series H: Audiovisual and Multimedia Systems—infrastructure of audiovisual services—Coding of moving video: High Efficiency Video Coding", International Telecommunication Union, Recommendation ITU-T H.265, Oct. 2014, 540 pages.

ITU-T, "High Efficiency Video Coding", Recommendation ITU-T H.265, Series H: Audiovisual and Multimedia Systems, Infrastructure of Audiovisual Services—Coding of Moving Video, Feb. 2018, 692 pages.

\* cited by examiner

METHOD AND APPARATUS FOR ENCODING AND DECODING VOLUMETRIC CONTENT IN AND FROM A DATA STREAM

CROSS REFERENCE TO RELATED APPLICATIONS

This application is a U.S. National Stage Application under 35 U.S.C. 371 of International Patent Application No. PCT/EP2021/065894, filed Jun. 14, 2021, which is incorporated herein by reference in its entirety.

This application claims the benefit of European Patent Application No. 20305695.7, filed Jun. 24, 2020.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

A volumetric video (3DoF+ or 6DoF) is a sequence of 3D scenes. A solution to encode volumetric videos is to project each 3D scene of the sequence onto projection maps which are clustered in color (or other attributes) pictures and depth pictures, called patches. Patches are packed in color and depth images which are stored in the video track of a video stream. This encoding has the advantage to make use of standard image and video processing standards. At the decoding, pixels of the color pictures are inverse projected at a depth determined by information stored in the associated depth picture. Such solutions are effective. However, encoding this huge amount of data as images in the video track of a video stream raises problems. The size of the bit stream induces bitrate technical issues regarding storage space, transmission over a network and decoding performances.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method comprising obtaining, from a data stream, an attribute atlas image, a geometry atlas image. An (attribute or geometry) atlas image packs patch pictures. A (attribute or geometry) patch picture is a projection of a sample of a three-dimensional scene. Metadata are also obtained from the data stream. Metadata comprise, for an attribute patch picture of the attribute atlas image:
  projection parameters associated with the attribute patch picture, and
  information indicating if the attribute patch picture is associated with a geometry patch picture of the geometry atlas image or if the attribute patch picture is associated with a depth value encoded in the metadata.

On condition that an attribute patch picture is associated with a geometry patch picture, the method comprises inverse projecting pixels of the attribute patch picture at a location determined by the geometry patch picture and projection parameters associated with the attribute patch picture.

Or, on condition that an attribute patch picture is associated with a depth value, the method comprises inverse projecting pixels of the attribute patch picture at a location determined by the depth value and projection parameters associated with the attribute patch picture.

In an embodiment, pixels of the attribute patch pictures encode two (or more) values for different attributes (e.g. color, normal, lighting, heat, velocity). In another embodiment, an attribute atlas is obtained per attribute. The different attribute atlases are encoded according to a same packing layout and metadata applies to corresponding patch pictures of each attribute atlas.

The present principles also relate to a device comprising a processor configured for implementing the method above.

The present principles also relate to a method comprising:
obtaining a set of attribute patch pictures associated with a geometry patch picture, attribute and geometry patch pictures being obtained by projecting samples of a three-dimensional scene according to projection parameters;
for an attribute patch picture of the set of attribute patch pictures,
packing the attribute patch picture in an attribute atlas image; and
if the geometry patch picture associated with the attribute patch picture is comparable to a planar layer at a location determined by a depth value and the projection parameters, generating metadata comprising the projection parameters, the depth value and information indicating that the attribute patch picture is associated with the depth value or,
in the other case, packing the geometry patch picture in a geometry atlas image and generating metadata comprising the projection parameters and information indicating that the attribute patch picture is associated with the geometry patch picture; and
encoding the attribute atlas image, the geometry atlas image and the generated metadata in a data stream.

The present principles also relate to a device comprising a processor configured for implementing the method above.

The present principles also relate to a data stream, for example generated by the method above. The data stream comprises an attribute atlas image, a geometry atlas image, an atlas image packing patch pictures, a patch picture being a projection of a sample of a three-dimensional scene; and metadata comprising, for an attribute patch picture of the attribute atlas image:
projection parameters associated with the attribute patch picture, and
information indicating if the attribute patch picture is associated with a geometry patch of the geometry atlas image or if the attribute patch picture is associated with a depth value encoded in the metadata.

In an embodiment, pixels of the attribute patch pictures encode two (or more) values for different attributes (e.g. color, normal, lighting, heat, velocity). In another embodiment, the data stream comprises an attribute atlas per attribute. The different attribute atlases are encoded according to a same packing layout and metadata applies to corresponding patch pictures of each attribute atlas.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
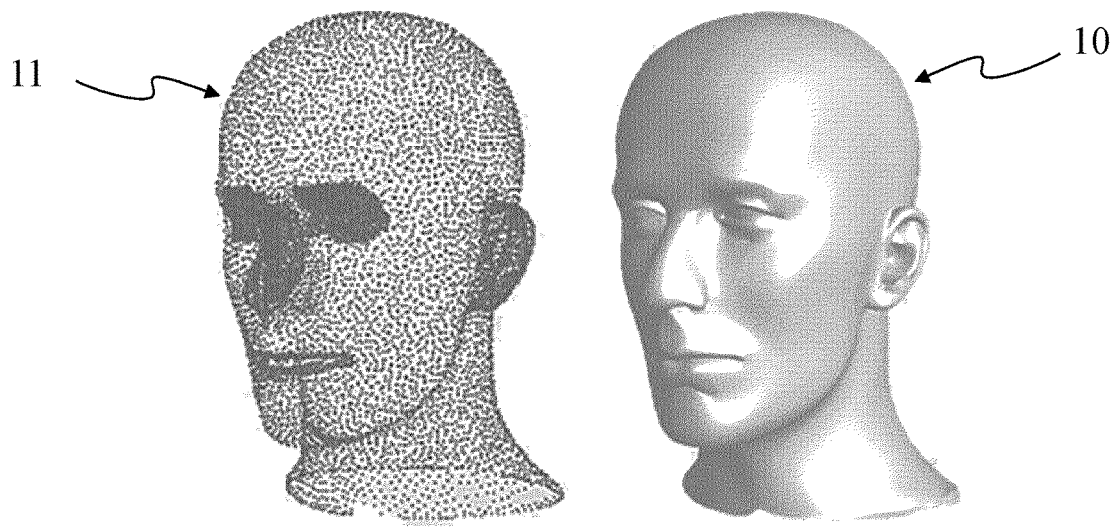
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

Figure 2:
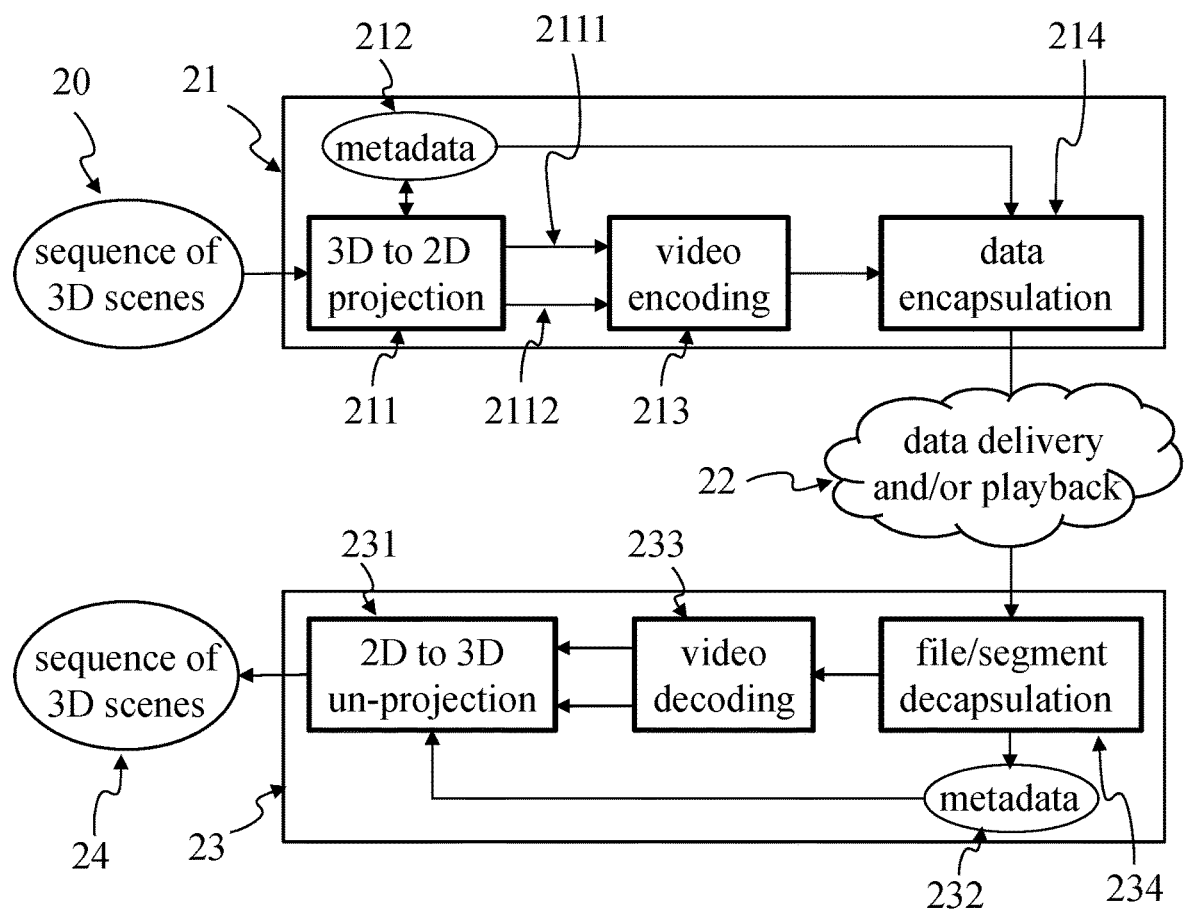
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by the bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);
- 3D-HEVC (an extension of HEVC whose specification is found at the ITU website, T recommendation, H series, h265, http://www.itu.int/rec/T-REC-H.265-201612-I/en annex G and I);
- VP9 developed by Google; or
- AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:
- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to inverse project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
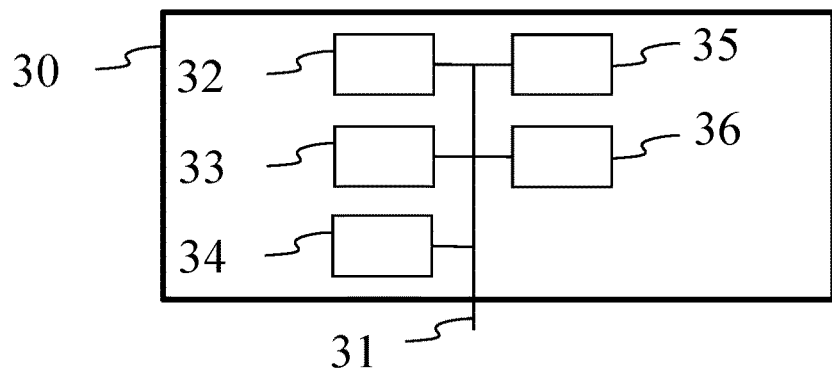
FIG. 3 shows an example architecture of a device which may be configured to implement a method described in relation with FIGS. 10 and 11, according to a non-limiting embodiment of the present principles.
Figure 10:
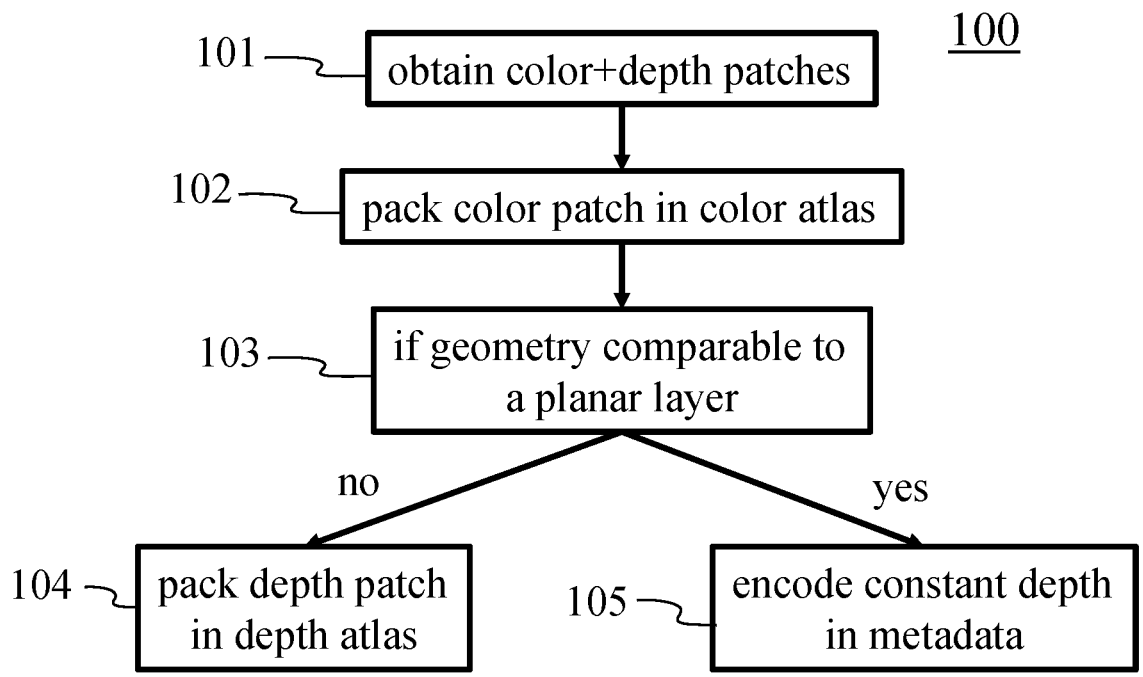
FIG. 10 illustrates a method 100 for encoding a volumetric content according to a non-limitative embodiment of the present principles.
Figure 11:
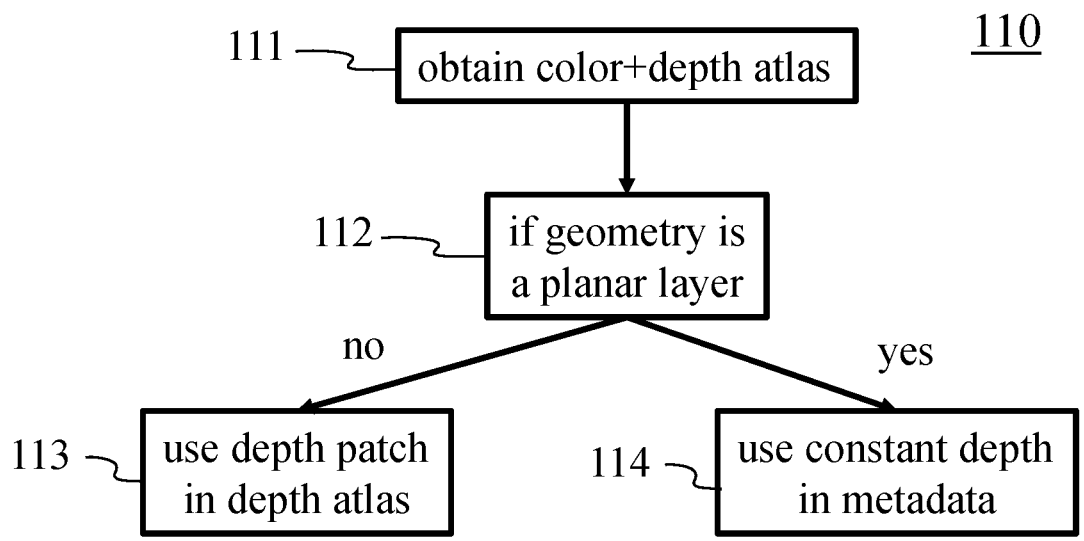
FIG. 11 illustrates a method 110 for decoding a data stream representative of a volumetric content according to a non-limitative embodiment of the present principles.

FIG. 3 shows an example architecture of a device 30 which may be configured to implement a method described in relation with FIGS. 10 and 11. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 10 and 11, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
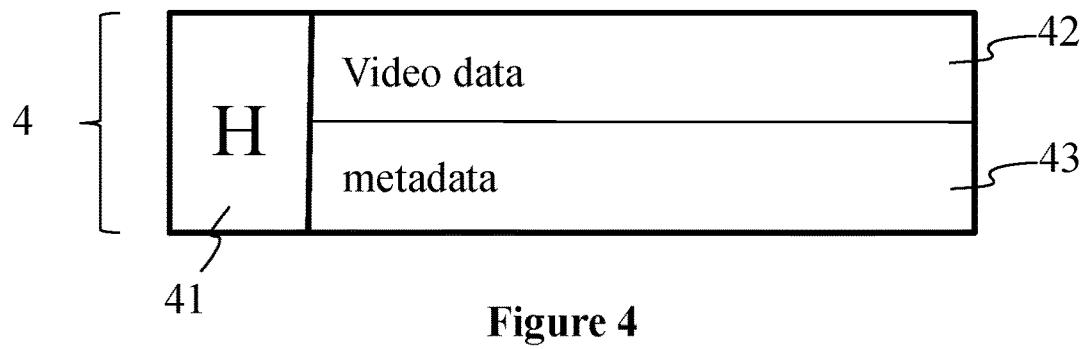
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
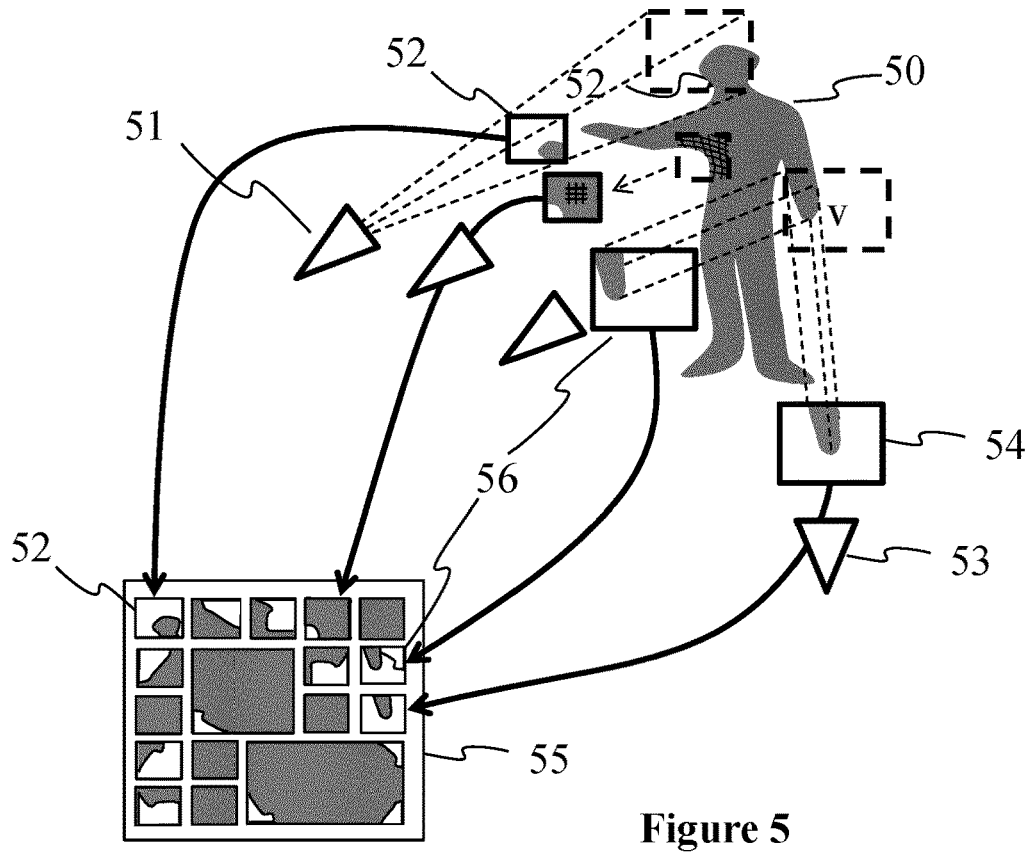
FIG. 5 illustrates a spherical projection from a central point of view, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6A:
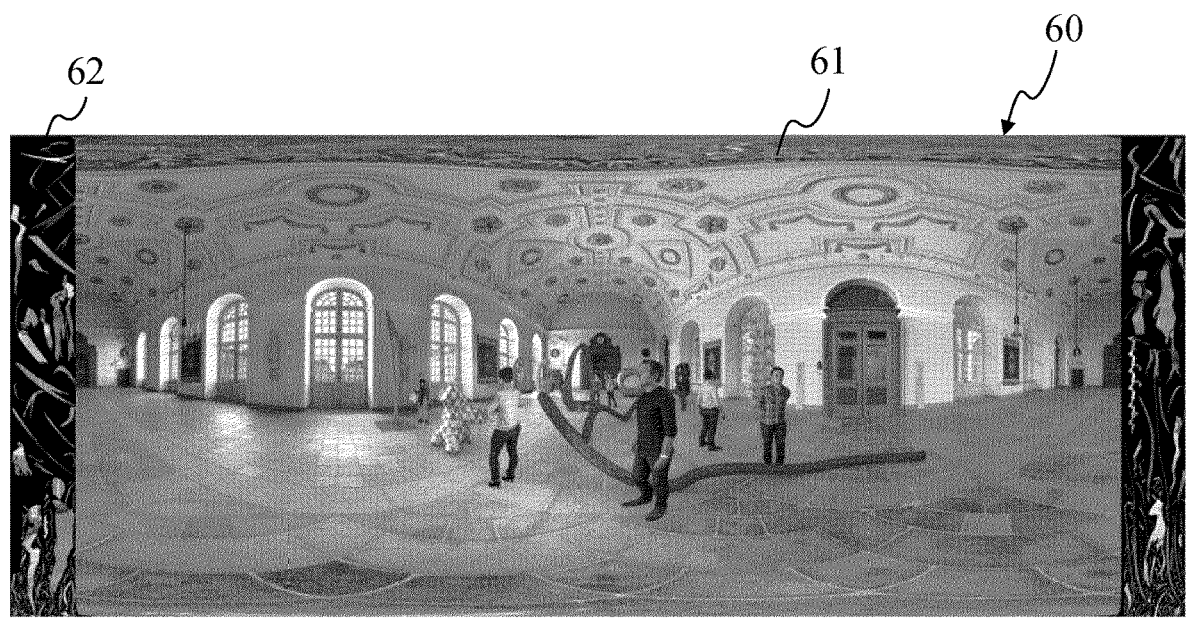
FIG. 6a shows an example of an atlas comprising the texture information of the points of a 3D scene, according to a non-limiting embodiment of the present principles.

FIG. 6*a* shows an example of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a first part 61 comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the left and right borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 6B:
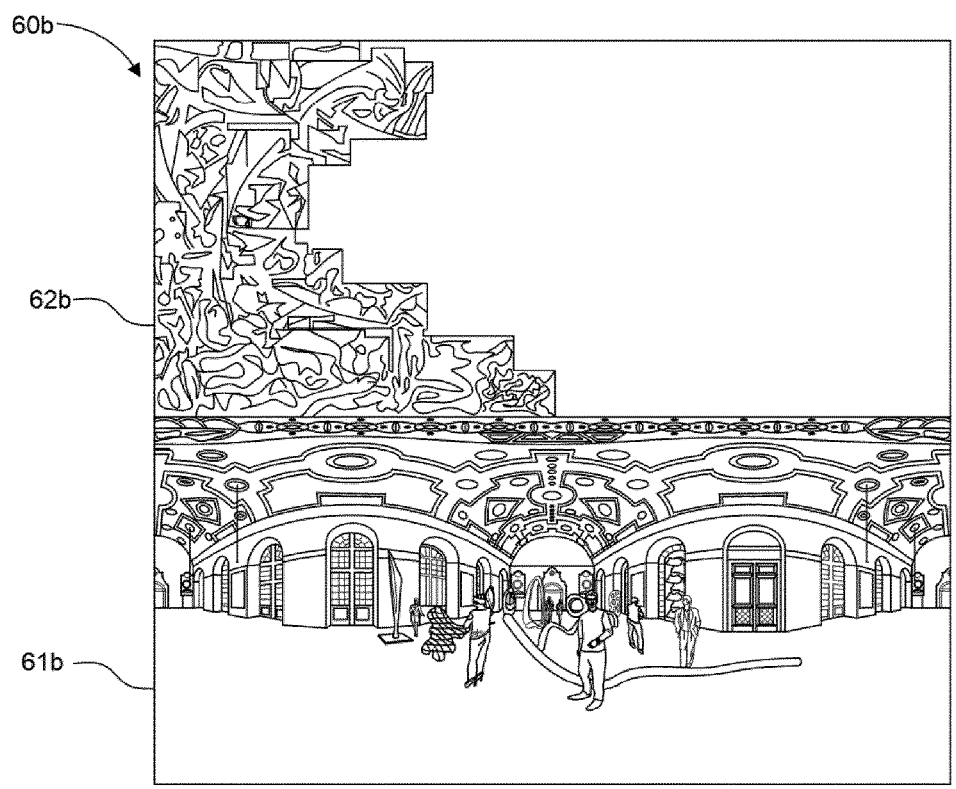
FIG. 6b shows a later color frame of the 3D scene sequence of FIG. 6a encoded in an atlas with a different layout

FIG. 6*b* shows a later color frame of the 3D scene sequence of FIG. 6*a* encoded in an atlas with a different layout. First part 61*b*, corresponding to first part 61 of FIG. 6*a*, also called central patch, is located at the bottom of atlas image 60*b* and second part 62*b*, corresponding to part 62 of FIG. 6*a*, is located at the top of atlas image 60*b*.

Figure 7A:
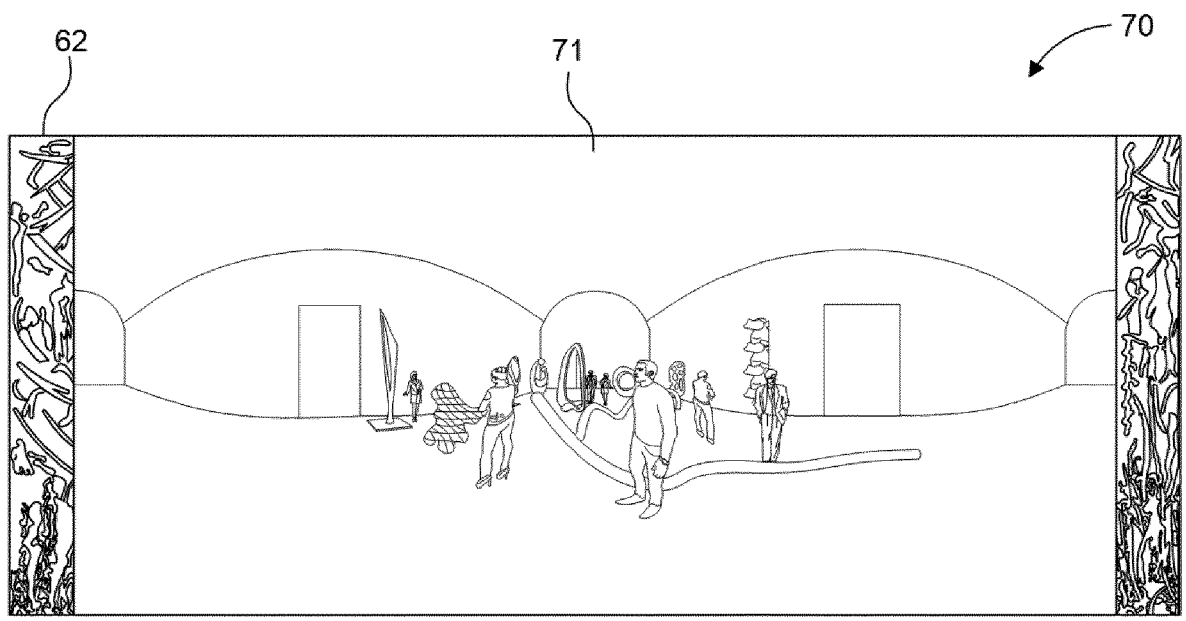
FIG. 7a shows an example of an atlas comprising the depth information of the points of the 3D scene of FIG. 6a, according to a non-limiting embodiment of the present principles.

FIG. 7*a* shows an example of an atlas 70 comprising the depth information of the points of the 3D scene of FIG. 6*a*, according to a non-limiting embodiment of the present principles. Atlas 70 may be seen as the depth image corresponding to texture image 60 of FIG. 6*a*.

Atlas 70 comprises a first part 71 comprising the depth information of the points of the 3D scene that are visible from the central point of view and one or more second parts 72. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information needs to be encoded/decoded for the 3DoF rendering. There is no need to encode points of the scene that are not visible from this unique point of view for a 3DoF rendering as the user cannot access to them.

With regard to 6DoF rendering, the user may move the viewpoint in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

Figure 7B:
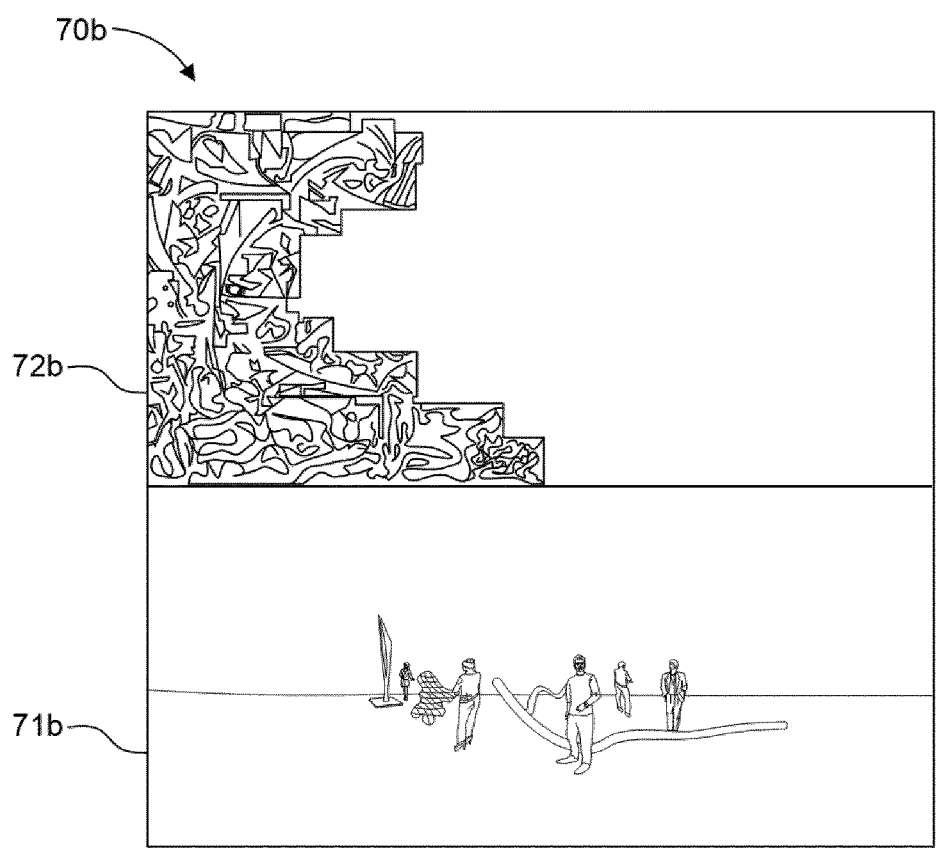
FIG. 7b shows a later depth frame of the 3D scene sequence of FIG. 7a encoded in an atlas with a different layout according to a non-limitative embodiment of the present principles.

FIG. 7b shows a later depth frame of the 3D scene sequence of FIG. 7a encoded in an atlas with a different layout. In the example of FIG. 7b, depth encoding is the inverse than the depth encoding in FIG. 7. In FIG. 7b, the closer an object, the brighter its projection onto the patch. As for example FIG. 7, the number of depth patches in second part 72b is the same as the number of color patches in first part 62b of FIG. 6. If the layout of atlases of FIGS. 6a and 7a is different from the layout of atlases of FIGS. 6b and 7b, FIGS. 6a and 7a share the same layout and FIGS. 6b and 7b share the same layout. The metadata associated with a patch do not indicate a difference between a color patch and a depth patch.

Figure 8:
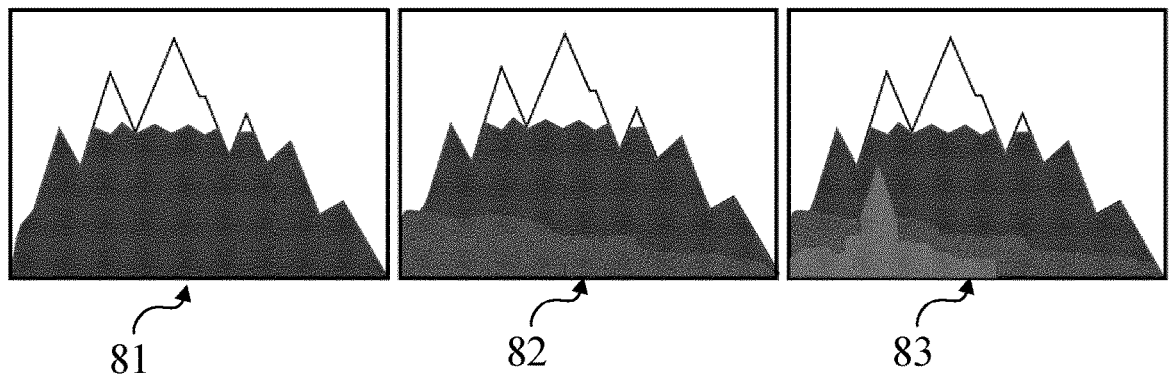
FIG. 8 illustrates a planar cardboard scene composed of three layers obtained from three cardboard patches according to a non-limitative embodiment of the present principles.

FIG. 8 illustrates a planar "cardboard" scene composed of three layers obtained from three cardboard patches. A 3D scene may be represented by several atlases encoded according to a same layout, one atlas image for the color attribute, one atlas image per other attribute (e.g. normal, lighting, heat, velocity, etc.) and one for the depth (i.e. geometry attribute). However, some simple 3D samples of the scene, herein called "cardboard" scenes may not require such level of complexity (i.e. a patch of geometry attributes) to be described because of their intrinsic nature. Indeed, such samples are composed of a set of static stacked planar layers. A planar layer being a piece of surface in the 3D space (e.g. a flat rectangle or a piece of sphere or cylinder or a composition of such surfaces forming a piece of surface in the 3D space). According to the present principles, a "cardboard" scene is a part of the 3D scene represented by an ordered list of planar layers defined according to the camera used to acquire the patch. Due do this specific planar shape, transmitting a depth information to represent a cardboard object is overkill because it can be represented by a simple constant value from a given camera point of view.

According to the present principles, a cardboard patch is defined. The shape of the planar layer corresponding to the inverse projection of a cardboard patch is determined by the projection parameters of the patch itself. For instance, for a patch storing information obtained by orthogonal projection, the planar layer of the cardboard patch is a rectangular flat plane. In a variant, when pixels of the cardboard patch are obtained by a spherical projection, the planar layer of the cardboard is a piece of sphere. Any other projection mode may be used to create a cardboard patch, for instance pyramidal or cubical projection modes. In every variant, the "depth" information is constant.

On the example of FIG. 8, a first cardboard patch is used to generate a planar layer 81 at a first depth z1. A second cardboard patch, acquired according to the same camera and, so, sharing the same projection parameters as the first cardboard patch, are used to generate a planar layer 82 with the same shape at a second depth z2, z2 being lower than z1. A third cardboard patch with the same projection parameters than the first and second cardboard patches is used to generate a planar layer 83 in front of the two others at a depth z3, z3 being lower than z2. A cardboard patch is encoded in the color atlas (and optionally in other attributes atlases). However, as the depth of a cardboard patch is a constant associated with the projection parameters of the patch, the carboard patch has no counterpart in the depth atlas.

Figure 9:
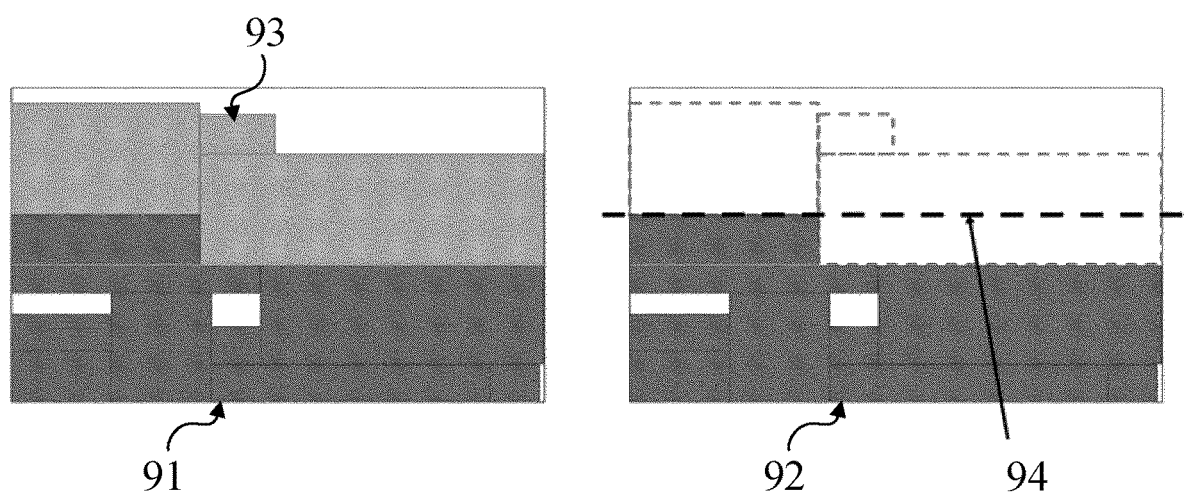
FIG. 9 illustrates an example attribute+depth atlas layout according to a non-limitative embodiment of the present principles.

FIG. 9 illustrates an example attribute+depth atlas layout according to the present principles. Depending on whether a patch has been obtained to be represented as a cardboard patch or as a regular patch, the patch is encoded or not in the geometry/depth atlas frame. The technical effect of this method is a gain in terms of pixel rate for the transmission. In an embodiment, all patches of a given atlas are cardboard patches. In this embodiment, the encoding of the volumetric video comprises only a color atlas (and optionally other attributes atlases) but no depth atlas.

In an embodiment, cardboard patches are gathered in a single atlas, separated from an atlas packing regular patches. In this embodiment, the encoding of the volumetric scene comprises three atlases: a color atlas and a depth atlas with a shared layout and a cardboard atlas with no depth counterpart. In a variant, regular and cardboard patches may co-exist and a packing strategy is implemented to decrease the overall pixel rate as illustrated in FIG. 9. The example of FIG. 9 illustrates a method which has no impact on the packing alignment of color and depth information. This method consists, at the encoding stage, in sorting out the patches starting by the regular ones and finishing by the cardboard patches. Using such a MaxRect-like strategy for the packing leads to couples of color and depth atlases like those depicted in FIG. 4. Regular depth patches 91 and 92 are grouped, for instance, at the bottom of the color and the geometry depth frames while cardboard patches 93 are grouped, for instance, at the top. The depth atlas is cropped to fit the useful size along a line 94. As a consequence, the overall pixel rate is reduced.

Another embodiment considers two independent packings for the color and depth information. In this embodiment, the color and the depth/geometry atlas frames are independent. This leads to better flexibility and efficiency of the encoding. However, the packing information associated to every patch have to be duplicated to report both color and geometry packing.

If the cardboard patches are not fully occupied (i.e. some pixels are transparent and generate no 3D point as in the example of FIG. 8), then this has to be signaled. In an embodiment, an occupancy map is built to transmit the usefulness of each pixel. This information may be time-varying. Occupancy maps is a well-known technique that may advantageously be used to convey this information. It is a binary map indicating whether a pixel of one given atlas is occupied. In the embodiment where all cardboard patches are packed in a dedicated atlas, this atlas does not require a geometry atlas but does require an occupancy map. In another embodiment, the transparency of pixels is encoded in a 4-channels image, for instance, a RGBA image, the fourth channel Alpha encoding a binary or a gradual transparency. According to the present principles, a totally transparent pixel generates no 3D point. A partially transparent pixel generates an equally partially transparent 3D point.

Cardboard patches have to be signaled in the data stream according to one of the embodiments described hereinbefore so that the decoder is able to generate 3D points with the right geometry. A first syntax for metadata describing patches and their projection parameters, the metadata being associated with a pair (optionally more) atlases consists in specifying a per patch cardboard signaling to inform the decoder that this patch is to be decoded as a regular or as a cardboard-like patch. In this embodiment, a patch is defined by a patch_data_unit structure which comprises the information associated with its relative position in the view that the patch comes from, as well as to its relative position in the atlas frame it is packed into. The patch_data_unit structure also comprises two fields named pdu_depth_start and pdu_depth_end which indirectly refer to the depth range of the patch. An additional flag pdu_cardboard_flag is used for signaling the cardboard supplementary property. If enabled, the decoder should not try to retrieve the patch geometry from the depth/geometry atlas frame but rather by simply reading its constant depth value within the patch_data_unit structure. To do so the pdu_depth_start information is interpreted as the actual depth of the patch (and pdu_depth_end is enforced to be equal to pdu_depth_start). In another embodiment, a check of the equality (pdu_depth_start==pdu_depth_end) may determine whether the considered patch is a regular or a cardboard patch. In another embodiment, a field pdu_cardboard_depth may be added to signal the patch depth value. An additional flag pdu_fully_occupied_flag, conditional to pdu_cardboard_flag being true, may be introduced to signal whether all pixels of a cardboard patch are valid and, then, whether an occupancy map has to be obtained and used or whether a fourth channel Alpha is used in the encoded atlases.

|  | Descriptor |
|---|---|
| patch_data_unit( p ) { | |
|   pdu_2d_pos_x[ p ] | ue(v) |
|   pdu_2d_pos_y[ p ] | ue(v) |
|   pdu_2d_size_x_minus1[ p ] | ue(v) |
|   pdu_2d_size_y_minus1[ p ] | ue(v) |
|   pdu_view_pos_x[ p ] | u(v) |
|   pdu_view_pos_y[ p ] | u(v) |
|   pdu_depth_start[ p ] | u(v) |
|   if( asps_normal_axis_max_delta_value_enabled_flag ) | |
|     pdu_depth_end[ p ] | u(v) |
|   pdu_view_id[ p ] | u(v) |
|   pdu_orientation_index[ p ] | u(v) |
|   if( afps_lod_mode_enabled_flag ) { | |
|     pdu_lod_enabled_flag[ p ] | u(1) |
|     if( pdu_lod_enabled_flag[ p ] > 0 ) { | |
|       pdu_lod_scale_x_minus1[ p ] | ue(v) |
|       pdu_lod_scale_y_idc[ p ] | ue(v) |
|     } | |
|   } | u(v) |
|   if( asps_point_local_reconstruction_enabled_flag ) | |
|     point_local_reconstruction_data( p ) | |
|   if( asps_miv_extension_flag ) | |
|     pdu_miv_extension( p ) | |
| } | |

|  | Descriptor |
|---|---|
| pdu_miv_extension( p ) { | |
|   if( vme_max_entities_minus1 > 0 ) | |
|     pdu_entity_id[ p ] | u(v) |
|   if( asme_depth_occ_threshold_flag ) | |
|     pdu_depth_occ_threshold[ p ] | u(v) |
|   pdu_cardboard_flag | u(1) |
|   if ( pdu_cardboard_flag ) | |
|     pdu_fully_occupied_flag | u(1) |
| } | |

Another embodiment of a syntax signals that a given camera/projection is associated with cardboard patches only. Every patch is created from one specific projection mode which is signaled within the bitstream syntax. An atlas conveys patches coming from multiple projections. Patches associated with a camera where the cardboard flag is enabled have to be interpreted, at the decoder side, as having their depth information described in the per-patch information rather than from a depth atlas frame. When the mvp_fully_occupied flag is equal to 1, all patches belonging to the view are fully occupied. When mvp_fully_occupied flag is equal to 0, the patches may be fully occupied or not.

|  | Descriptor |
|---|---|
| miv_view_params_list( ) { | |
|   mvp_num_views_minus1 | u(16) |
|   for( a = 0; a<= vps_atlas_count_minus1; a++ ) | |
|     for( v = 0; v<= mvp_num_views_minus1; v++ ) | |
|       mvp_view_enabled_in_atlas_flag[ a ][ v ] | u(1) |
|       if( mvp_view_enabled_in_atlas_flag[ a ][ v ] ) | |
|         mvp_view_complete_in_atlas_flag [ a ][ v ] | u(1) |
|   mvp_explicit_view_id_flag | u(1) |
|   if( mvp_explicit_view_id_flag ) | |
|     for( v = 0; v <= mvp_num_views_minus1; v++ ) | |
|       mvp_view_id[ v ] | u(16) |
|   for( v = 0; v <= num_views_minus1; v++ ) | |
|     camera_extrinsics( v ) | |
|   mvp_intrinsic_params_equal_flag | u(1) |
|   for( v = 0; v <= mvp_intrinsic_params_equal_flag ? 0 : mvp_num_views_minus1; v++ ) | |
|     camera_intrinsics( v , 0 ) | |
|   mvp_depth_quantization_params_equal_flag | u(1) |
|   for( v = 0; v <= mvp_depth_quantization_equal_flag ? 0 : mvp_num_views_minus1; v++ ) | |
|     depth_quantization( v ) | |

-continued

| | Descriptor |
|---|---|
| mvp_pruning_graph_params_present_flag | u(1) |
| if ( mvp_pruning_graph_params_present_flag ) | |
|   for( v = 0; v <= mvp_num_views_minus1; v++ ) | |
|     pruning_parents( v ) | |
| mvp_cardboard_flag | u(1) |
| if ( mvp_cardboard_flag ) | |
|   mvp_fully_occupied_flag | u(1) |
| } | |

In another embodiment, the signaling of cardboard patches is embedded at the level of metadata describing an atlas. Each couple of color and depth atlases is described at a high-level by a set of very general properties including depth scaling or grouping attributes, for instance. A cardboard flag indicates to the decoder that all patches associated with this specific atlas are cardboard patches and that depth information should be retrieved from per-patch information rather than from a geometry atlas frame. Cardboard patches may be grouped within a dedicated atlas which would therefore not require any associated depth/geometry frame. When the asme_fully_occupied flag is equal to 1, all patches belonging to the view are fully occupied. When asme_fully_occupied flag is equal to 0, the patches may be fully occupied or not.

| | Descriptor |
|---|---|
| asps_miv_extension( ) { | |
|   asme_group_id | u(v) |
|   asme_auxiliary_atlas_flag | u(1) |
|   asme_depth_occ_threshold_flag | u(1) |
|   if( vme_geometry_scale_enabled_flag == 1 ) { | |
|     asme_geometry_scale_factor_x_minus1 | u(v) |
|     asme_geometry_scale_factor_y_minus1 | u(v) |
|   } | |
|   asme_cardboard_flag | u(1) |
|   if ( asme_cardboard_flag ) | |
|     asme_fully_occupied_flag | u(1) |
| } | |

Besides pixel rate and bitrate improvement, making use of one of these signaling of the cardboard mode may also impact the decoder performances by allowing faster strategies for the rendering. Indeed, very efficient rendering techniques such as the painter's algorithm may be used by the informed decoder. Such a method stacks graphic primitives associated with patches from the background to the foreground and does not require any complex visibility computation.

FIG. 10 illustrates a method 100 for encoding a volumetric content according to a non-limitative embodiment of the present principles. At a step 101, color (or any attribute) and depth patch pictures are obtained by projecting samples of the volumetric scene to encode onto projection surfaces and according to projection parameters as illustrated, for instance, in relation to FIG. 5. At a step 102, at least one color (or any attribute) atlas is prepared. The color patch is packed in one color atlas. In an embodiment, color patches associated with a planar layer rather than with a depth patch are packed in a separate color atlas. At a step 103, the method determines whether the depth (or other geometry data) patch is comparable to a planar layer as described above, that is whether the color patch is a cardboard patch. For instance, a cardboard patch may be created as an environment map for the background combined with regular patches for the remainder of the volumetric scene. The scene may be generated with a regular background with flat cardboard objects inside. Such a flat cardboard can be directly used as a cardboard patch. The scene may be represented as realized in cartoon domain as illustrated in FIG. 8. Cardboard patches may straightforwardly be created from such slides. If the depth patch is not comparable to a planar layer, the depth patch is packed in the geometry atlas and is associated with the color patch in the metadata at a step 104. Otherwise, the depth patch is not encoded in any atlas and information indicating that the depth of the color patch is determined thanks to the projection parameters and a constant depth value is encoded in the metadata with the constant depth value. The method encodes the at least one attribute atlas, the geometry atlas and the metadata for every color patch in a data stream.

FIG. 11 illustrates a method 110 for decoding a data stream representative of a volumetric content according to a non-limitative embodiment of the present principles. At a step 111, a data stream representative of a volumetric scene is obtained from a source. An attribute atlas (e.g. color, normal, . . . ) and a geometry atlas (e.g. depth 3D coordinates, . . . ) and associated metadata are decoded from the data stream. At a step 112, for a given attribute patch packed in the attribute atlas, information indicating whether the attribute patch is a cardboard patch is extracted from the metadata. If it is not, then a step 113 is performed, and the pixels of the attribute patch are inverse projected according to a geometry patch packed in the geometry atlas and associated to the current attribute patch in the metadata. Inverse projection uses inverse projection parameters associated with the attribute patch in the metadata. If the attribute patch is a cardboard patch, then, a step 114 is performed. At step 114, a planar layer is reconstructed using the projection parameters and the depth value stored in the metadata. Pixels of the attribute patch are inverse projected onto this planar layer.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of synthetizing a viewport image, the method comprising:
   obtaining, from a data stream, an attribute atlas image, a geometry atlas image, an atlas image packing patch pictures, a patch picture being a projection of a sample of a three-dimensional scene, and metadata comprising, for an attribute patch picture of the attribute atlas image:
   projection parameters associated with the attribute patch picture, and
   information indicating if the attribute patch picture is associated with a geometry patch picture of the geometry atlas image or if the attribute patch picture is associated with a depth value encoded in the metadata;
   on a condition that an attribute patch picture is associated with a geometry patch picture, synthetizing the viewport image by inverse-projecting pixels of the attribute patch picture at a location determined by the geometry patch picture and projection parameters associated with the attribute patch picture; and
   on a condition that an attribute patch picture is associated with a depth value, synthetizing the viewport image by inverse-projecting pixels of the attribute patch picture at a location determined by the depth value and projection parameters associated with the attribute patch picture.

2. The method of claim 1, wherein pixels of the attribute atlas image encode two values for two different attributes, the two different attributes being inverse-projected together.

3. The method of claim 1, wherein the data stream comprises two attribute atlases encoded according to a same packing layout, the metadata being generated for a pair of attribute patch pictures of each attribute atlases, the pair of attribute patch pictures being inverse-projected together.

4. A device for synthetizing the viewport image, the device comprising a processor configured for:
   obtaining, from a data stream, an attribute atlas image, a geometry atlas image, an atlas image packing patch pictures, a patch picture being a projection of a sample of a three-dimensional scene, and metadata comprising, for an attribute patch picture of the attribute atlas image:
   projection parameters associated with the attribute patch picture, and
   information indicating if the attribute patch picture is associated with a geometry patch of the geometry atlas image or if the attribute patch picture is associated with a depth value encoded in the metadata;
   on a condition that an attribute patch picture is associated with a geometry patch picture, synthetizing the viewport image by inverse-projecting pixels of the attribute patch picture at a location determined by the geometry patch picture and projection parameters associated with the attribute patch picture; and
   on a condition that an attribute patch picture is associated with a depth value, synthetizing the viewport image by inverse-projecting pixels of the attribute patch picture at a location determined by the depth value and projection parameters associated with the attribute patch picture.

5. The device of claim 4, wherein pixels of the attribute atlas image encode two values for two different attributes, the two different attributes being inverse-projected together.

6. The device of claim 4, wherein the data stream comprises two attribute atlases encoded according to a same packing layout, the metadata being generated for a pair of attribute patch pictures of each attribute atlases, the pair of attribute patch pictures being inverse-projected together.

7. A method comprising:
obtaining a set of attribute patch pictures associated with a geometry patch picture, attribute and geometry patch pictures being obtained by projecting samples of a three-dimensional scene according to projection parameters;
for an attribute patch picture of the set of attribute patch pictures,
packing the attribute patch picture in an attribute atlas image; and
if the geometry patch picture associated with the attribute patch picture is comparable to a planar layer at a location determined by a depth value and the projection parameters, generating metadata comprising the projection parameters, the depth value and an information indicating that the attribute patch picture is associated with the depth value or,
in the other case, packing the geometry patch picture in a geometry atlas image and generating metadata comprising the projection parameters and information indicating that the attribute patch picture is associated with the geometry patch picture; and
encoding the attribute atlas image, the geometry atlas image and the metadata in a data stream.

8. The method of claim 7, wherein pixels of the attribute atlas image encode two values for two different attributes.

9. The method of claim 7, wherein the set of attribute patch pictures comprises pairs of attribute patch pictures for two different attributes, the pairs of attribute patch pictures being packed in two attribute atlases according to a same packing layout and the metadata being generated for a pair of attribute patch pictures.

10. A device comprising a processor configured for:
obtaining a set of attribute patch pictures associated with a geometry patch picture attribute and geometry patch pictures being obtained by projecting samples of a three-dimensional scene according to projection parameters;
for an attribute patch picture of the set of attribute patch pictures,
packing the attribute patch picture in an attribute atlas image; and
if the geometry patch picture associated with the attribute patch picture is comparable to a planar layer at a location determined by a depth value and the projection parameters, generating metadata comprising the projection parameters, the depth value and an information indicating that the attribute patch picture is associated with the depth value or,
in the other case, packing the geometry patch picture in a geometry atlas image and generating metadata comprising the projection parameters and information indicating that the attribute patch picture is associated with the geometry patch picture; and
encoding the attribute atlas image, the geometry atlas image and the metadata in a data stream.

11. The device of claim 10, wherein pixels of the attribute atlas image encode two values for two different attributes.

12. The device of claim 10, wherein the set of attribute patch pictures comprises pairs of attribute patch pictures for two different attributes, the pairs of attribute patch pictures being packed in two attribute atlases according to a same packing layout and the metadata being generated for a pair of attribute patch pictures.

13. A non-transitory computer readable medium containing an attribute atlas image, a geometry atlas image, an atlas image packing patch pictures, a patch picture being a projection of a sample of a three-dimensional scene, and metadata comprising, for an attribute patch picture of the attribute atlas image:
projection parameters associated with the attribute patch picture; and
information representative of an inverse-projecting mode indicating if the attribute patch picture is associated with a geometry patch of the geometry atlas image or if the attribute patch picture is associated with a depth value encoded in the metadata.

14. The non-transitory computer readable medium of claim 13, wherein pixels of the attribute atlas image encode two values for two different attributes.

15. The non-transitory computer readable medium of claim 13, comprising two attribute atlases encoded according to a same packing layout.

16. A non-transitory computer readable medium storing instructions that, when executed by one or more processors, perform the method of claim 1.

17. The non-transitory computer readable medium of claim 16, wherein pixels of the attribute atlas image encode two values for two different attributes, the two different attributes being inverse-projected together.

18. The non-transitory computer readable medium of claim 16, wherein the data stream comprises two attribute atlases encoded according to a same packing layout, the metadata being generated for a pair of attribute patch pictures of each attribute atlases, the pair of attribute patch pictures being inverse-projected together.

* * * * *